United States Patent [19]
Babaian et al.

[11] Patent Number: 5,418,975
[45] Date of Patent: May 23, 1995

[54] WIDE INSTRUCTION WORD ARCHITECTURE CENTRAL PROCESSOR

[75] Inventors: Boris A. Babaian; Vladimir J. Volkonsky; July K. Sakhin; Sergei V. Semenikhin; Valery Y. Gorshtein; Alexandr K. Kim; Leonid N. Nazarov, all of Moscow, Russian Federation

[73] Assignee: Institut Tochnoi Mekhaniki I Vychislitelnoi Tekhniki Imeni S.A. Lebedeva Akademii Nauk SSSR, Moscow, Russian Federation

[21] Appl. No.: 971,910

[22] PCT Filed: Aug. 20, 1991

[86] PCT No.: PCT/SU91/00169
 § 371 Date: Dec. 18, 1992
 § 102(e) Date: Dec. 18, 1992

[87] PCT Pub. No.: WO92/17847
 PCT Pub. Date: Oct. 15, 1992

[30] Foreign Application Priority Data
Mar. 27, 1991 [SU] U.S.S.R. .......................... 4920073/24

[51] Int. Cl.⁶ .............................................. G06F 9/00
[52] U.S. Cl. ................................ 395/800; 364/232.21; 364/232.9
[58] Field of Search ................ 364/401, 232.21, 228.7, 364/228.8, 228.9, 231.9, 232.21, 232.9, 931.41, 931.42, 931.51, 931.52, 937.7; 395/800

[56] References Cited
U.S. PATENT DOCUMENTS

| | | | |
|---|---|---|---|
| 4,888,679 | 12/1989 | Fossum et al. | 364/200 |
| 4,974,146 | 11/1990 | Works et al. | 364/200 |
| 5,001,627 | 3/1991 | Sakamoto | 364/200 |
| 5,010,477 | 4/1991 | Omoda et al. | 364/200 |
| 5,222,244 | 6/1993 | Carbine et al. | 395/800 |
| 5,226,171 | 7/1993 | Hall et al. | 395/800 |
| 5,233,694 | 8/1993 | Hotta et al. | 395/800 |
| 5,237,702 | 8/1993 | Hayashi et al. | 395/800 |
| 5,241,633 | 8/1993 | Nishi | 395/375 |
| 5,274,818 | 12/1993 | Vasilevsky et al. | 395/700 |
| 5,283,874 | 2/1994 | Hammond | 395/375 |

FOREIGN PATENT DOCUMENTS

| | | |
|---|---|---|
| 0293851 | 12/1988 | European Pat. Off. |
| 2423006 | 11/1979 | France |
| 2827746 | 1/1979 | Germany |
| 84-02410 | 6/1984 | WIPO |

Primary Examiner—Donald E. McElheny, Jr.
Attorney, Agent, or Firm—Ladas & Parry

[57] ABSTRACT

A central processor for scientific-technica, economic-statistical computations, for solving the problems of modelling and control with the architecture of an extended instruction work comprises instruction data buffer memories 1 and 3, respectively, a control device 2, a data commutator 4, an arithmeticologic device 5, record-calling, indexing, associative memory, mathematical-to-physical address conversion, interface, subprogram device (6–11), as well as a control character device 13 and an operand readiness device 14, and provides high efficiency both on vector and scalar computations.

1 Claim, 12 Drawing Sheets

WIDE INSTRUCTION WORD ARCHITECTURE CENTRAL PROCESSOR

FIELD OF THE INVENTION

The invention relates to computing technology, more specifically to the central processors of computing systems. It can be used for scientific-technical and economic-statistical computations, the tasks of automation of designing, modelling and control.

PRIOR ART

Known in the art is a central processor usable in a computing system comprising arithmetical devices for performing operations over integers and the numbers with a floating point, which are controlled by an extended control work in each machine cycle. The processor comprises also register files, an arithmeticologic device of integral and floating arithmetics, a block of registers of presentation of information into a memory, a mathematical-to-physical-address-conversion block.

For storing a program in the central processor there is provided a buffer memory in which a command is stored in unpacked form (IEEE Transactions on computers, v.37, No.8, 1988, Robert P. Colwell, Robert P. Nix, John J. O. Donnel, David B. Papworth, Paul K. Rodman, AVLIW Architecture for a Trace Scheduling Compiler, p. 967–979).

Such a processor has the architecture of an extended control work and its efficiency depends to a lesser degree on the nature of calculations, both scalar and/or vector ones.

However, this processor is designed mainly for the solution of tasks of numerical analysis with well predicted transfer direction or with the absence of prediction, its efficiency is markedly reduced. Parallelism in operation on the cyclic portions of a program is attained by unrolling the cycles, which results in an increase in a code size and the lack of a possible code compacting on the boundaries between the unrolled cycles.

Known is a central processor usable in a computing system for scientific-technical, economic-statistical computation, the tasks of automation of designing, modelling and control with the architecture of an extended control word, which assures high efficiency both on vector and scalar computations and comprising an interface device coupling the central processor with an exchange bus with a common internal storage, a multi-channel arithmeticologic device permitting performing operations in conditional and unconditional cycles, a data commutator connecting the input of the arithmeticologic device with its output and with a data buffer memory comprising a plurality of the last procedure activations and a subset of element arrays preloaded for a subsequent processing in the cycle. The processor also contains a memory for storing data lacking in the data buffer memory, a call-recording device contributing to producing scalar addresses, and a multi-channel indexing device assuring the production of vector addresses for exchange with the common internal storage via a mathematical-to-physical address-conversion device, realizing additionally for the vectors the preliminary call of a line of the next mathematical page a subprogram device realizing the preparation of an address context, calling of a new program code and procedure switching without stopping a command decoder coupled with an associative memory and with the control means. For ensuring the parallel start of the arithmeticologic device, the call-recording device and multichannel indexing device and preparation of transfer command, provision is made of a control device also connected to the data buffer memory and the subprogram device.

The processor also comprises a command buffer memory with a control means storing a current working set of procedures (PCT/SU 90/00134).

DISCLOSURE OF THE INVENTION

However, when the initial operands usable in a command have not yet been read from the internal storage, blocking in a conventional device is formed with delay, which results in time losses because of a necessity to repeat the commands recorded after the disabled instruction.

It is the principal object of the present invention to provide a central processor with the architecture of and extended instruction word which would increase the efficiency of scalar and vector calculations on account of a reduction of cycle losses in the conveyer of instruction handling.

The task set is attained owing to the fact that the central processor of the type used for scientific-technical, economic-statistical computations, the solution of problems of automated designing, modelling and control with the architecture of an extended instruction word assuring high efficiency both on vector and scalar computations, comprising an interface device connecting the central processor with an exchange bus with a common internal storage, a multi-channel arithmeticologic device enabling one to perform operations in conditional and unconditional cycles, a data commutator connecting the input of said arithmeticologic device with its output and with a data buffer memory comprising several last procedure activations and a subset of element arrays preloaded for a subsequent treatment in the cycle, an associative data storage which are absent in the data buffer memory, a call-recording device contributing to producing scalar addresses and a multi-channel indexing device assuring the production of vector addresses for exchange with the common internal storage via a mathematical-to-physical address-conversion device realizing additionally for the vectors the preliminary call of a line of the next mathematical page, a subprogram device realizing the preparation of an address context, calling of a new program code and procedure switching without stopping instruction decoding, which is coupled with the associative memory, the mathematical-to-physical address-conversion device and with the control device ensuring the parallel start of the multi-channel arithmeticologic device, the call-recording device and the multi-channel indexing device and the pre-preparation of jump instructions also connected to the data buffer memory and the subprogram device, as well as the command buffer memory with the control device storing the current working set of procedures and coupled with the control device, in accordance with the invention, it comprises a control character device enabling the organization of control character device enabling the organization of control transmission along one of the pre-prepared directions without skipping the cycles with the dynamic renaming of addresses of the control characters in the cycle, and an operand readiness device, the operands being preinterrogated from the common internal storage, the control character device is coupled with the arithmeticologic device and control device, and said operand readiness device is connected to the control device, interface device and the mathematical-to-physical address-conversion device.

BRIEF DESCRIPTION OF DRAWINGS

The invention is further explained by a description of examples of its realization and by the drawings attached, wherein.

PREFERRED EMBODIMENT

Figure 1:
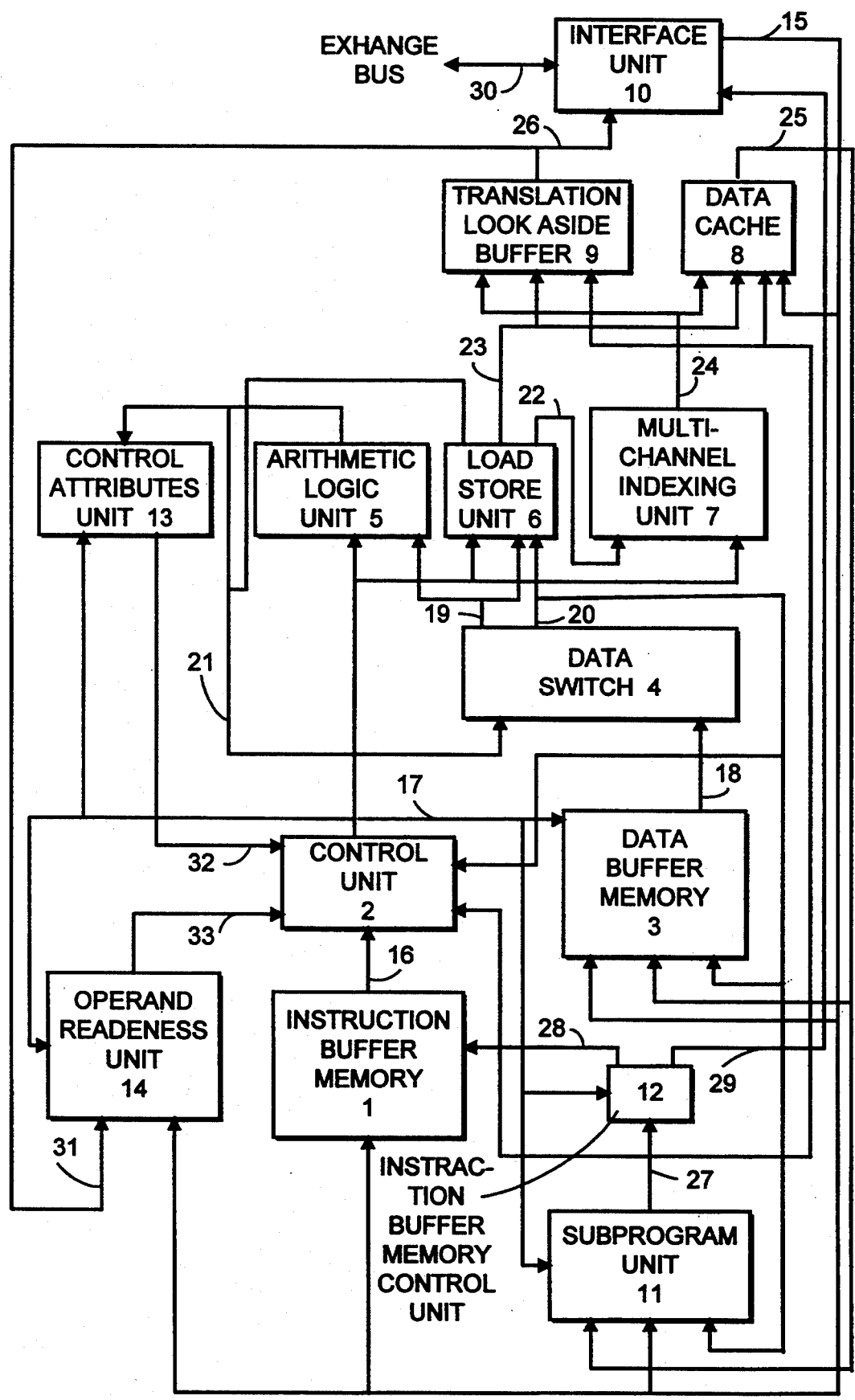
FIG. 1 represents the functional circuit of a central processor according to the invention.

The central processor of the type used for scientific-technical, economic-statistical computations, the tasks of automated designing, modelling and control contributing the excellent efficiency both on vector and scalar calculations is based on data processing according to the principle of an extended instruction word and comprises a buffer instruction memory I (FIG. 1) storing a current working set of procedures, a control device 2, a data buffer memory 3 comprising several last procedure activations and a subset of element arrays preloaded for subsequent treatment in the cycle, a data commutator 4, a multi-channel arithmeticologic arrangement 5, a call-recording device 6 for the production of scalar addresses and a multi-channel indexing device 7 assuring the production of the vector addresses.

The processor also comprises an associative memory 8 for storing data lacking in the buffer memory 3, a mathematical-to-physical address-conversion device 9 carrying out additionally for the vectors a preliminary call of the line of the following mathematical page, an interface device 10, a subprogram device II realizing the preparation of an address context, calling of a new program code and the switching of procedures without stopping the instruction decoding, and an instruction buffer memory control device 12.

The processor also comprises a control character device 13 permitting organizing control transmission along one of the pre-prepared directions without missing the cycles with the dynamic renaming of the control character addresses in the cycle and an operand readiness device 14, the operands being pre-interrogated from the common internal storage (not shown).

The data output of device 10 is connected with a bus 15 of data presentation with the buffer memory 3, an associative memory 8, a subprogram device 11, an operand readiness device 14 and with the instruction buffer memory I of which output is coupled via a bus 16 of instruction access with a control device 2 whose output is connected via an unpacked instruction bus 17 with the inputs of the data buffer memory 3, a control device 12 of the command buffer memory I, the subprogram device II, an arithmeticologic device 5, a call-recording device 6, an indexing device 7 and the operand readiness device 14. The output of buffer memory 3 is connected via a data access bus 18 is connected with a data commutator 4 whose outputs are coupled via an operand presentation bus 19 with the arithmeticologic device 5 and call-recording device 6, through a bus 20—with a control means, the buffer memory 3, the subprogram device II, and said call-recording device 6.

The outputs of arithmeticologic device 5 and call-recording device 6 are connected by an operation result bus 21 with a data commutator 4 and the output of said device 5 is connected also to the input of a control character device 13.

The call-recording device 6 is coupled via a data transmission bus 22 with an indexing device 7 and via a bus 23 of presentation of addresses and information with an associative memory 8 and a mathematical-to-physical address-conversion device 9. The output of device 7 is connected via an address presentation bus 24 with said device 9 and said device 8 whose output is connected via a data presentation bus 25 with a subprogram device II and the data buffer memory 3. Said device 9 is coupled via an address/information presentation bus 26 with an interface device 10 and an operand readiness device 14, and the output of said device II is coupled via an information presentation bus 27 with devices 2, 12, 9 and 8. The outputs of a device 12 for controlling the buffer memory of instructions are connected via an access control bus and an instruction address presentation bus 29, respectively, with the inputs of the buffer memory I and the interface device 10 which connects the central processor with a bus 30 for exchange with common internal storage.

The control input 31 of an instruction decoding blocking device 14 is connected with an address data presentation bus 26, said addresses and information being provided into the interface device 10. First & second control inputs 32 and 33 of a control means 2 and connected to the outputs of a control character device 13 and said device 14.

Figure 2:
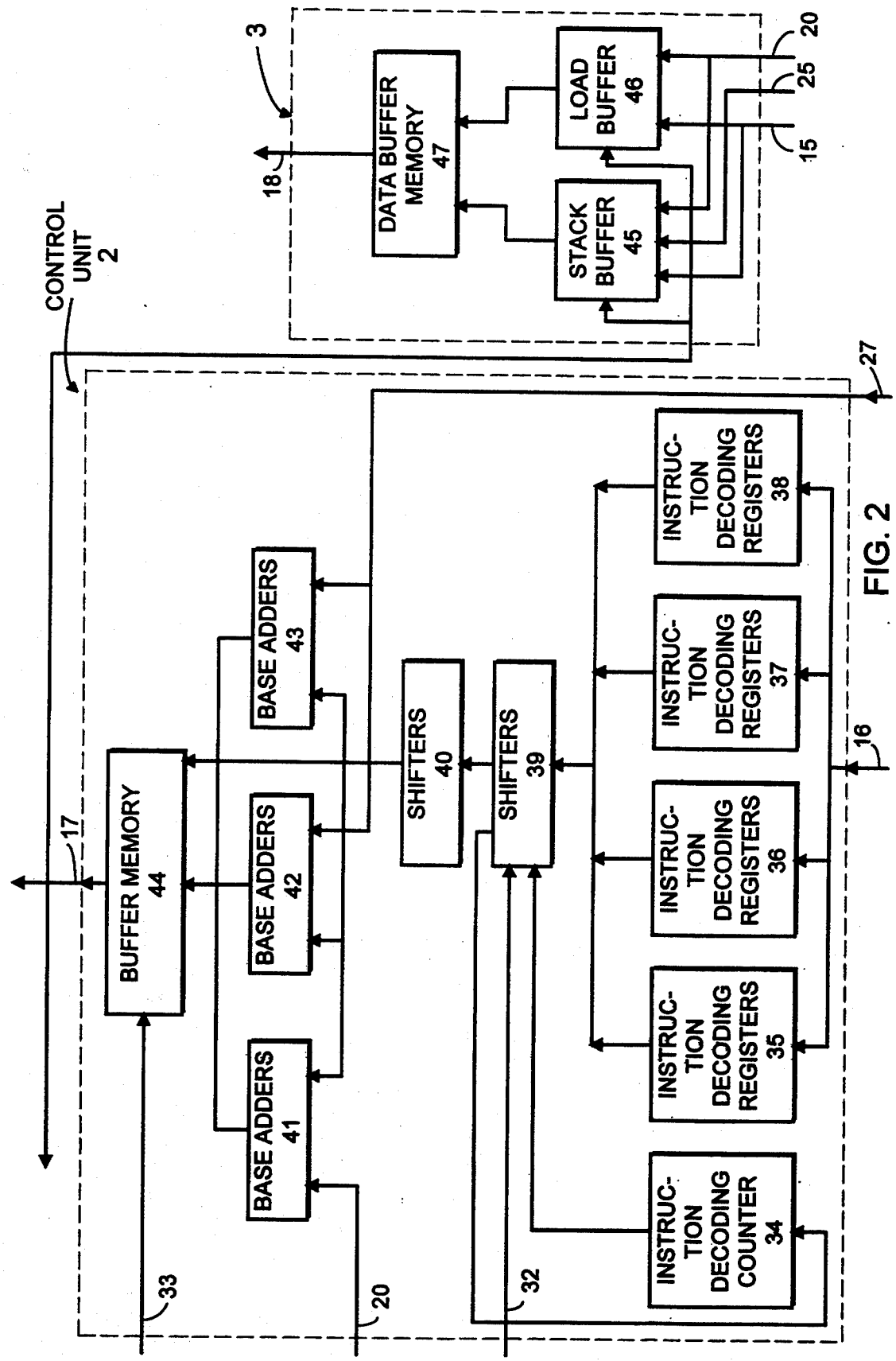
FIG. 2 is the functional circuit of a control means with a data buffer memory of the present invention.

A control means 2 (FIG. 2) comprises an instruction decoding counter 34, four instruction decoding registers 35–38, an instruction access shifter 39, an instruction unpacking shifter 40, three adders 41–43 for forming unpacked instruction fields, and an unpacked instruction buffer memory block 44. To the instruction input of the control device 2 are connected the inputs of instruction decoding registers 35–38 the outputs of which are connected to the first input of shifter 39 as mentioned above, whose second input is substantially a first control input of device 2 of which second control input is connected to the control input of said block 44 whose output is the output of the control device 2 whose information input is connected with a data recording bus 20 and coupled with the first input of a first adder 41 of said unpacked command field former, and the address input of said control device 2 is connected to an information presentation bus 27 and with the first inputs of second and third adders 42 and 43 of said unpacked instruction fields. The second inputs of adders 41–43 and first input of the unpacked command of block 44 are connected with the output of shifter 40, the outputs of adders 41–43 are connected to the second input of the unpacked command of the unpacked instruction buffer memory block 44, the instruction output of shifter 39 as identified above is connected to the input of the instruction unpacking shifter 10, the output of the command length of shifter 39 is connected with said command decoding counter 34 whose output is connected to the third input of shifter 39.

The device 3 (FIG. 2) of data buffer memory comprises a buffer memory strack block 45, a readout buffer memory block 46 and an output buffer memory block 47.

Figure 3:
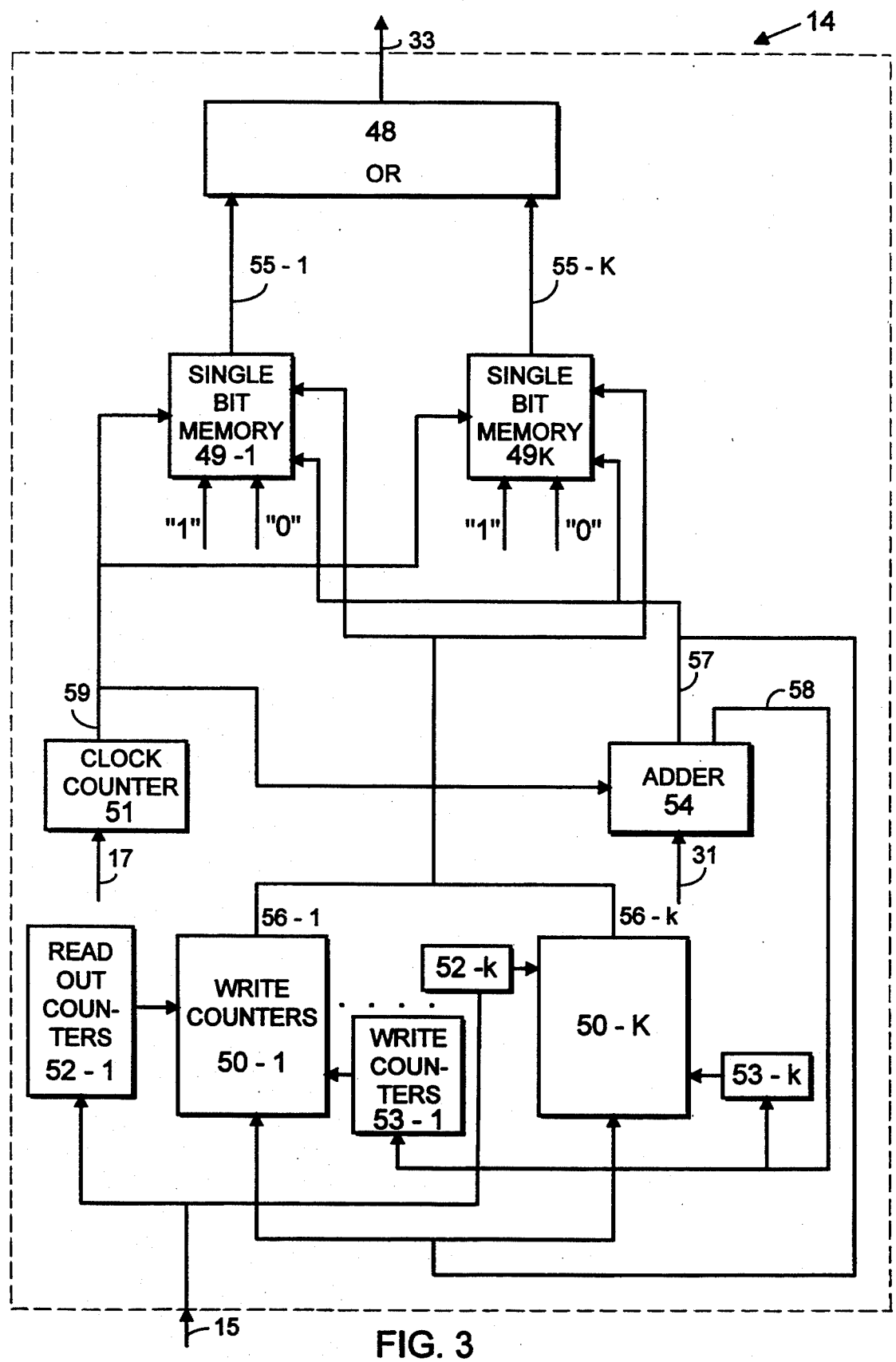
FIG. 3 is the functional circuit of an operand readiness device of the invention.

The instruction decoding blocking device 14 (FIG. 3) comprises an OR-element 48, three-port memory of single-digit K-blocks 41-1 . . . 49-K, two-port memory of K-blocks 50-1 . . . 50-K, a cycle counter 51, K-counters 52-1 . . . 52-K (readout) and K-counters 53-1 . . . 53-K (recording) and an adder 54. Outputs 55-1 . . . 55-K of blocks 48-1 . . . 48-K (memory) are connected with the corresponding inputs of OR-element 48 and outputs 56-1 . . . 56-K of blocks 50-1 . . . 50-K (memory) are connected to the first address inputs of recording blocks 49-1 . . . 49-K (memory), the second address recording inputs of which are connected to the information output 57 of the adder 54 whose control output 58 is connected to the inputs of counters 53-1 . . . 53-K. Output 59 of said cycle counter 51 is connected to the address readout input of each block 49-1 . . . 49-K (memory) and to the first information input of the adder 54 of which second information input is connected to the first control input 31 of the device 14 of the instruction decoding latching, the second control input of which is connected to the input of the cycle counter 51.

Figure 4:
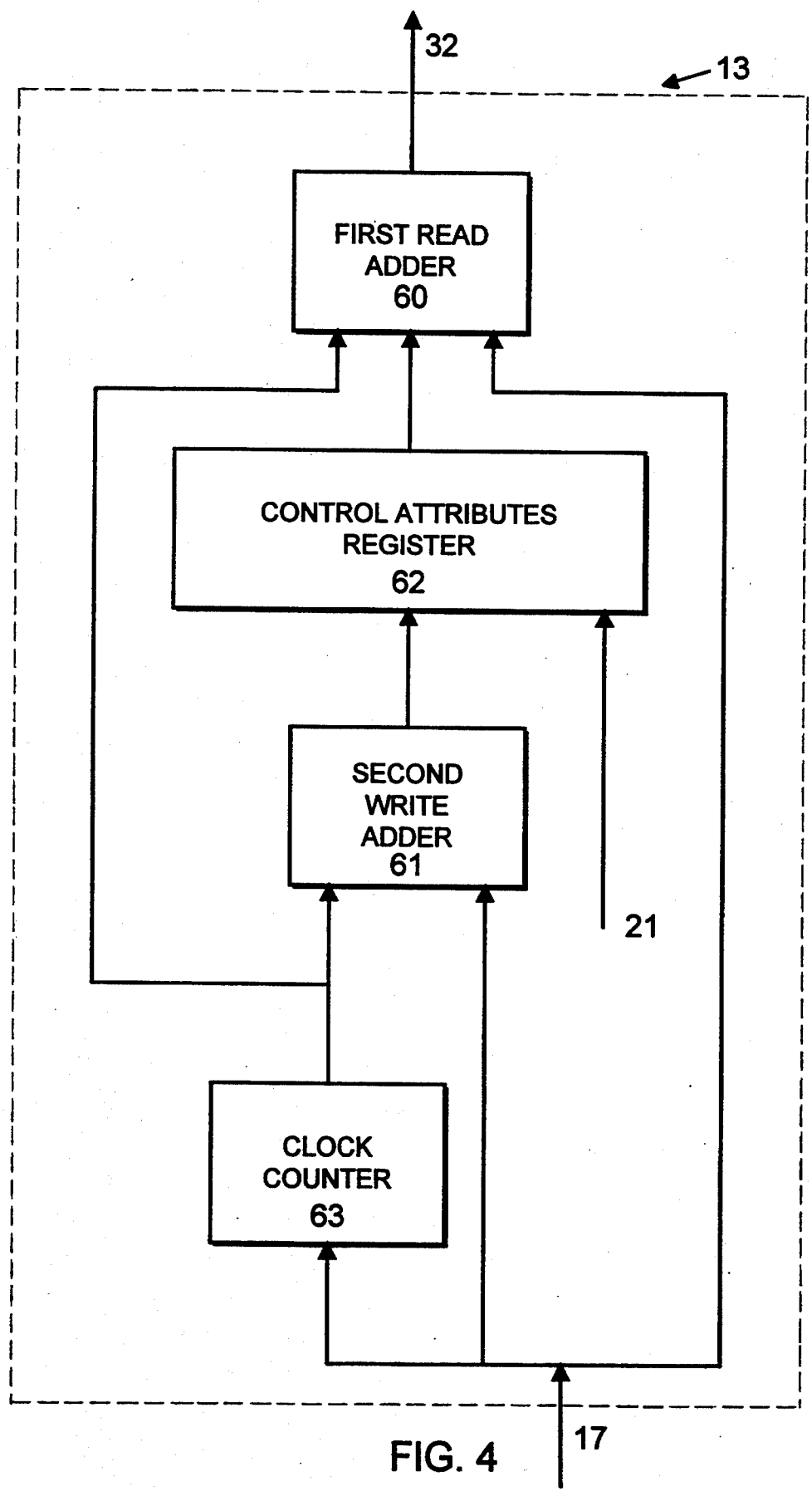
FIG. 4 is the functional circuit of a control character device of the invention.

Control character device 13 (FIG. 4) comprises first and second adders 60 and 61, respectively, a control character register 62 and a cycle counter 63. An unpacked instruction bus 17 is connected with the inputs of counter 63 and adders 60 & 61, a bus 21—with the information input of register 62, and the output of adder 60 is coupled with the control input 32 of the control means 2.

Figure 5:
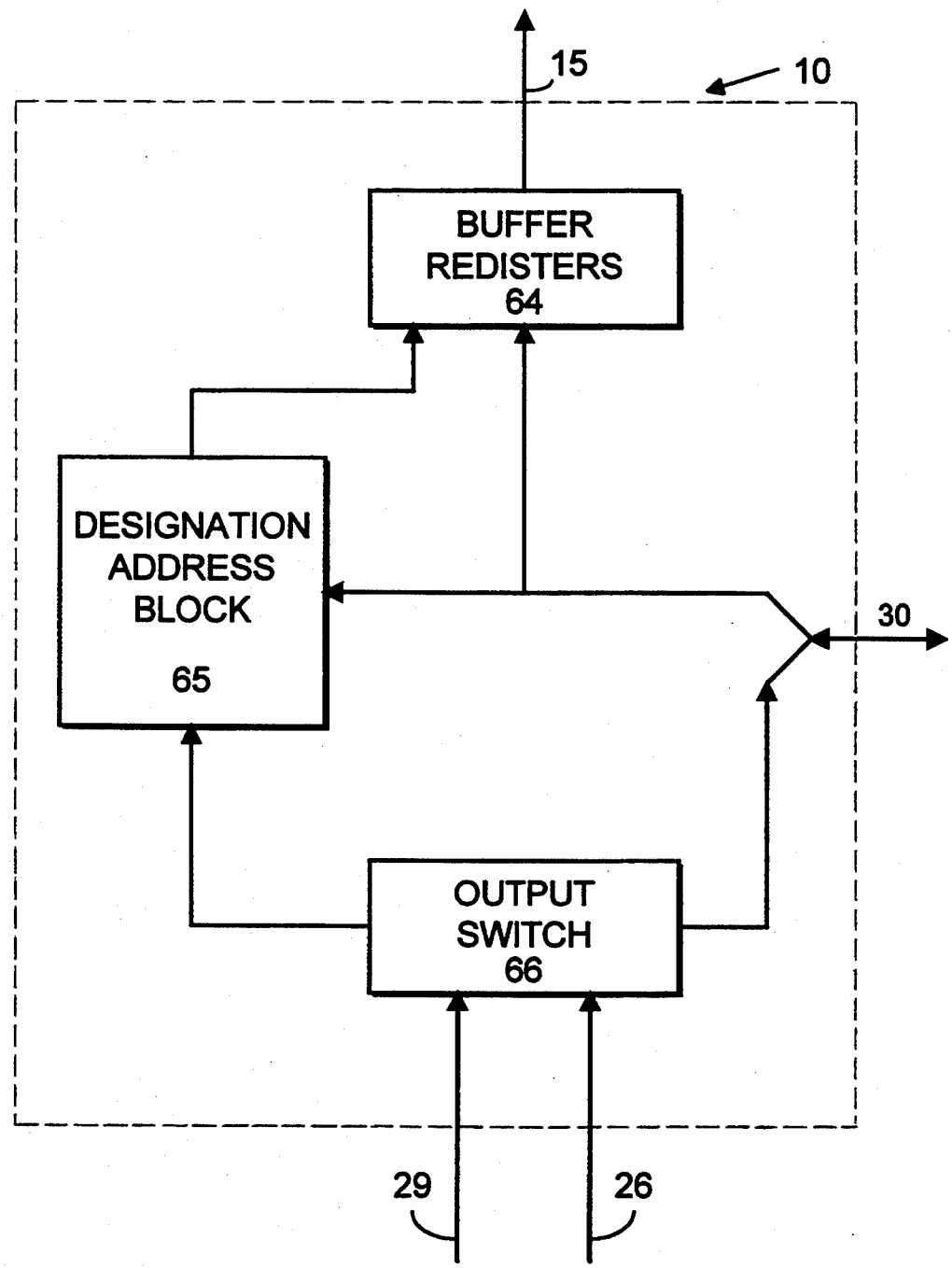
FIG. 5 is the functional circuit of an interface device of the invention

Interface device 10 (FIG. 5) comprises a block 64 of buffer registers, a designation address block 65 and an output commutator 66, of which an address-digital (numerical) input being substantially a first input of device 10 is connected to an adders-data bus 26, and an address input being in reality a second input of said interface device 10 is connected with a command address delivery bus 29. The output of block 64 being substantially the information output of said device 10 is connected to a bus 15, and the inputs of said block 64, said block 65 and the output of commutator 66 are connected to an exchange bus 30 with the internal storage.

Figure 6:
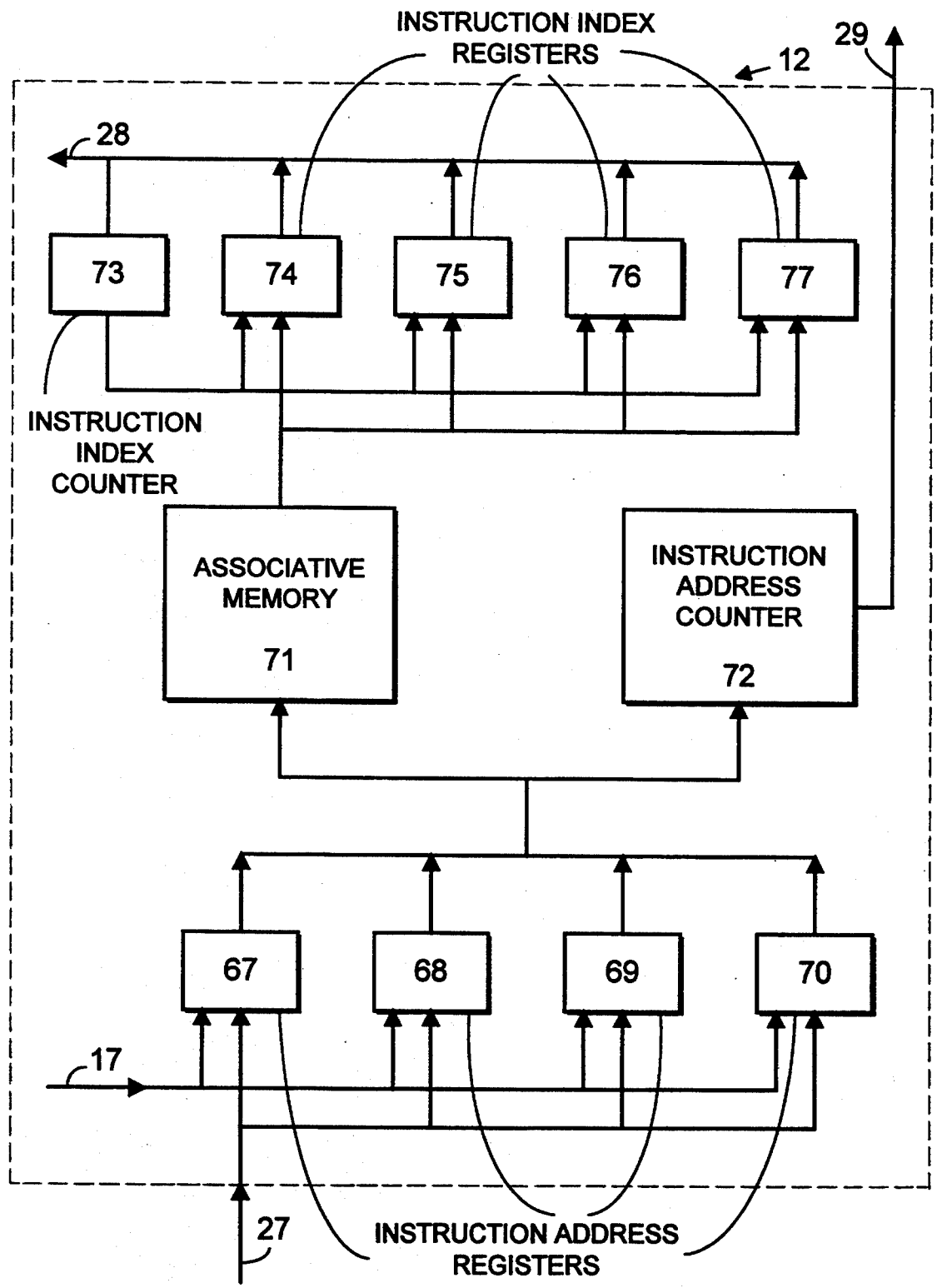
FIG. 6 is the functional circuit of an instruction buffer memory control device.

Device 12 (FIG. 6) of the type used for controlling an instruction buffer memory device comprises four registers 67–70 of an instruction number, an associative memory unit 71, a counter 72 of an instruction number, a counter 73 of an instruction index, and four instruction index registers 74–77. Data commutator 4 (FIG. 7) comprises a result memory block 78, result registers 79, an operand commutator 80, and a result commutator 81.

Figure 8:
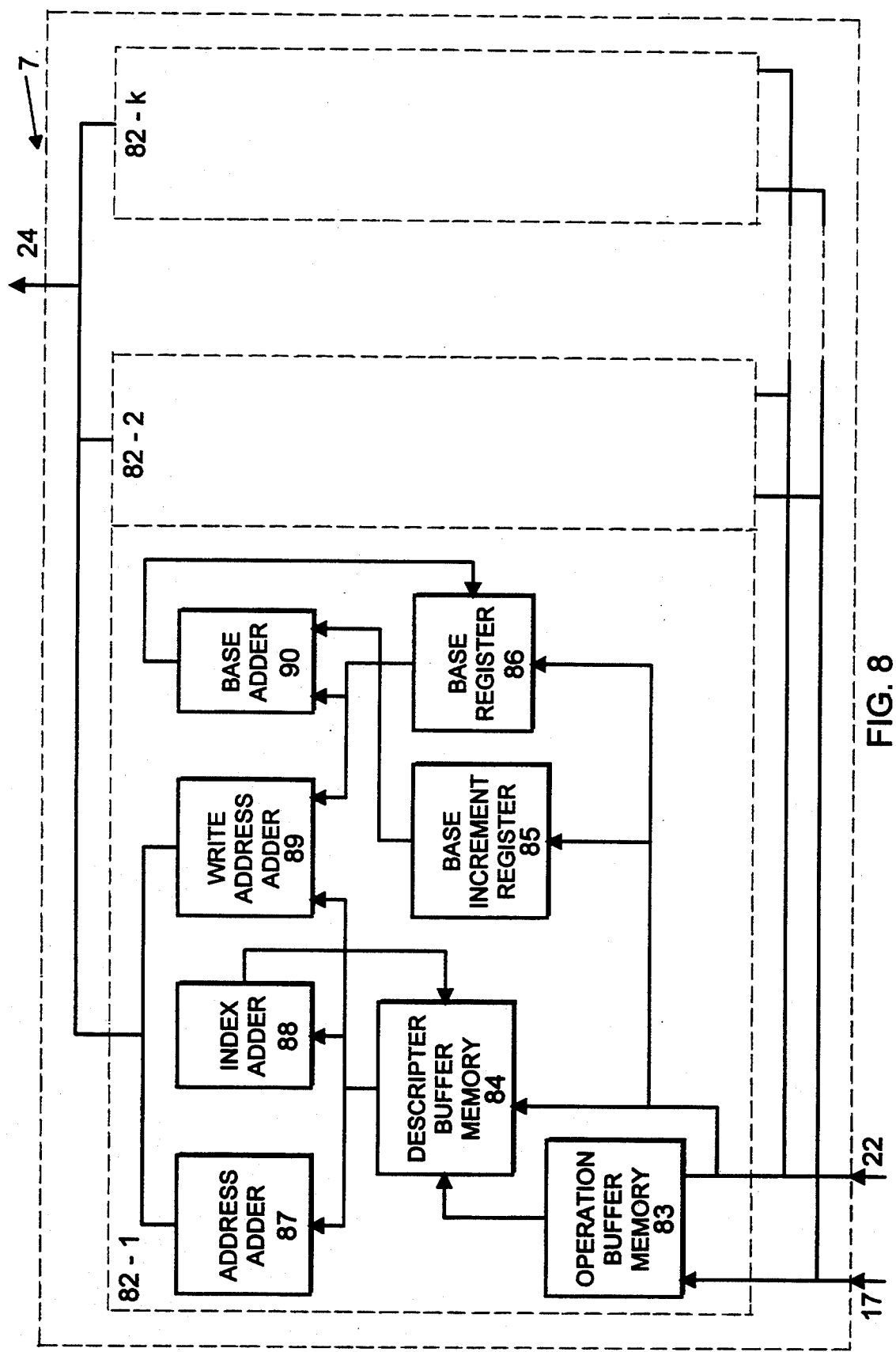
FIG. 8 is the functional circuit of a multi-channel indexing device of the present invention.

Indexing device 7 (FIG. 8) comprises K identical units 82-1—82-K, each having an operation buffer memory block 83, an array descriptor buffer memory block 84, a base increment register 85, a base register 86, a current address forming adder 87, a current index forming adder 88, an adder 89 for forming a recording address into a readout buffer memory block, and a new base value forming adder 90.

Figure 9:
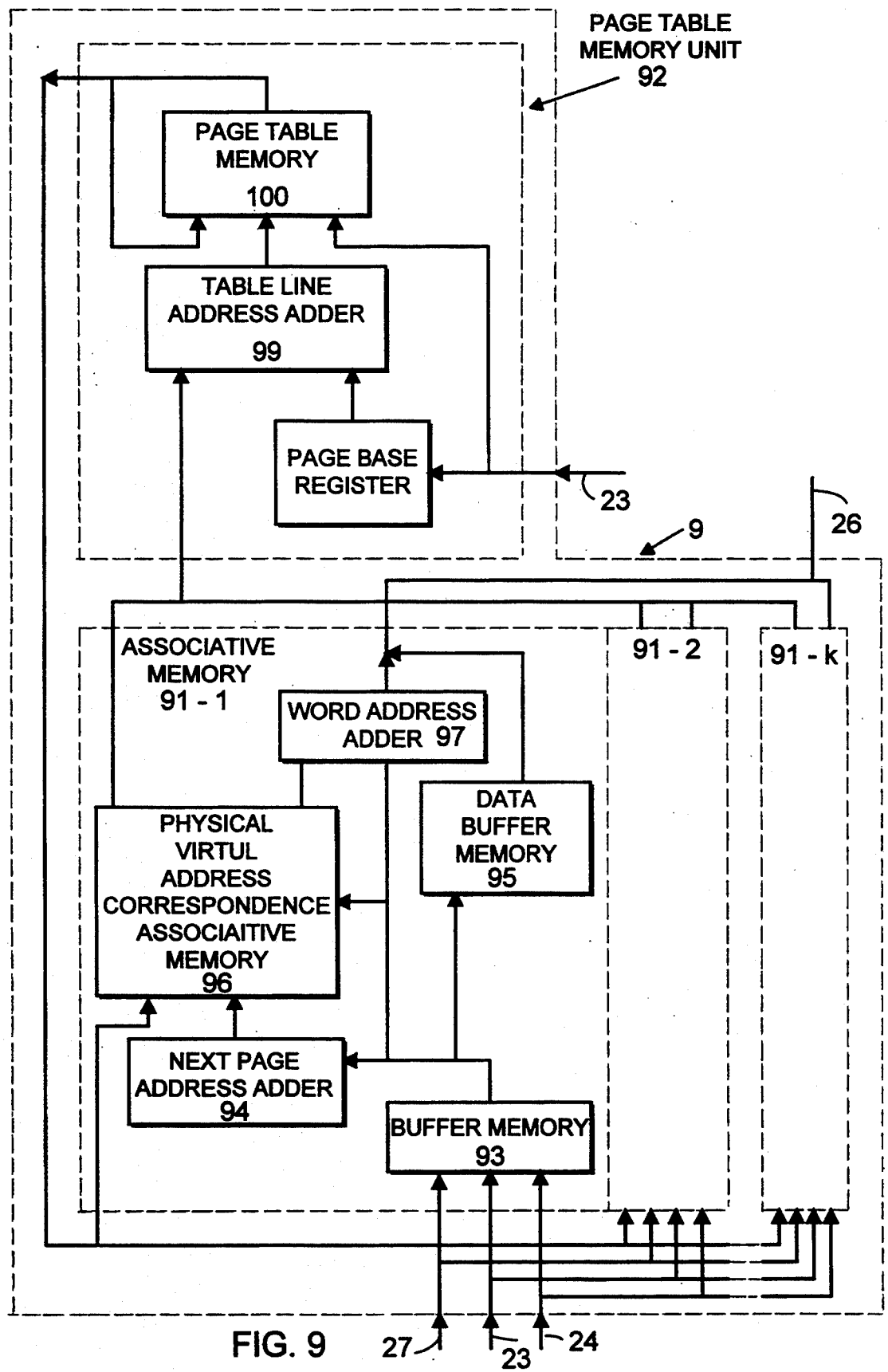
FIG. 9 is the functional circuit of a mathematical-to-physical address-conversion device of the present invention.

Device 9 (FIG. 9) of the type used for the conversion of a mathematical address into a physical address comprises K identical associative memory units 91-I—91-K and an internal storage page table block 92.

Each associative memory units 91-I—91-K comprises an input buffer memory block 93, a next page address forming adder 94, a data buffer memory block 95, a physical/mathematical address correspondence associative memory block 96, a word physical address forming adder 97. Said block 92 comprises a page base register 98, a table line address forming adder 99, and a page table memory block 100.

Figure 10:
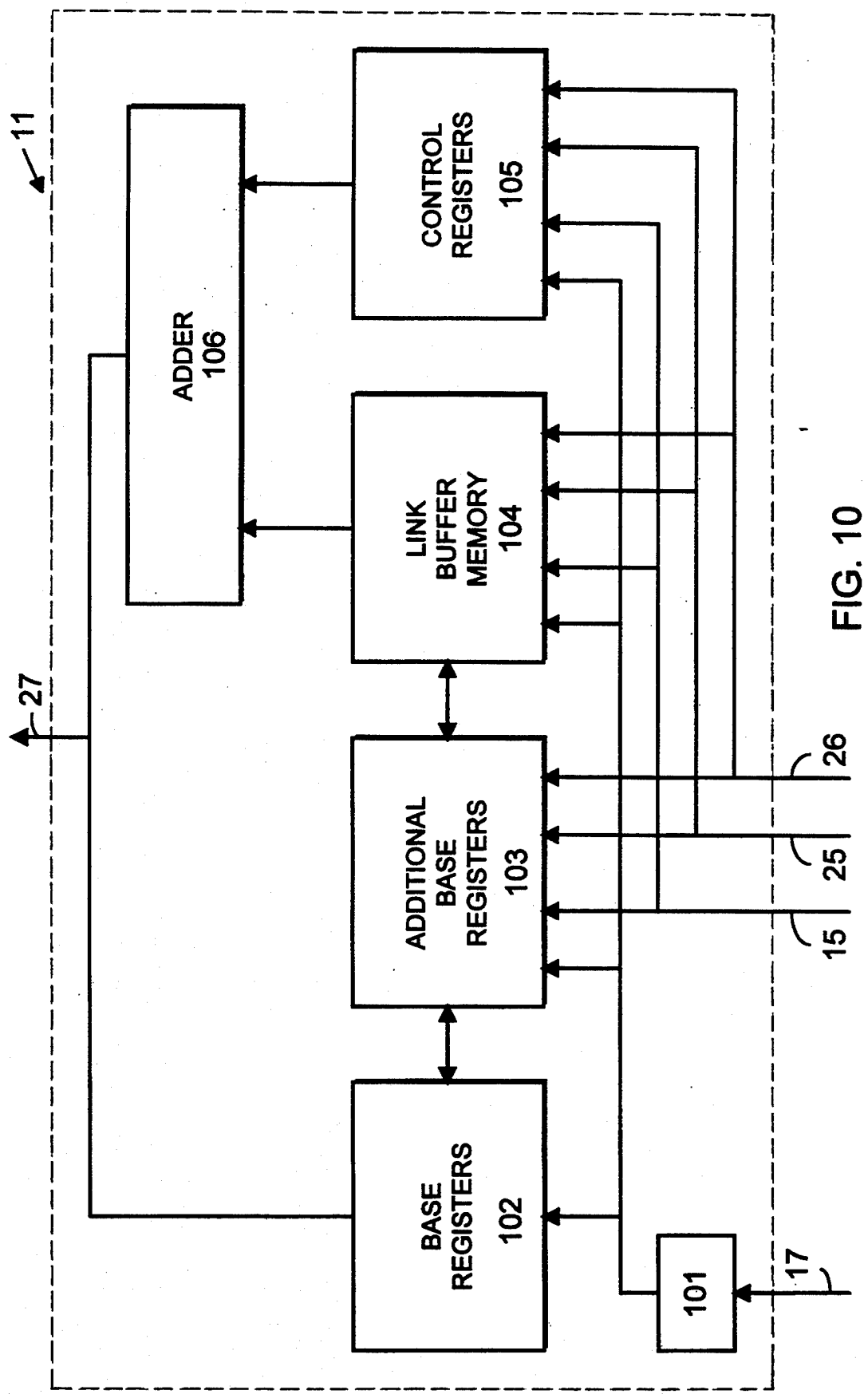
FIG. 10 is the functional circuit of a subprogram device of the present invention.

Subprogram device II (FIG. 10) comprises an instruction decoder 101, base registers 102, additional base registers 103, an associative information buffer memory block 104, control registers 105, and an adder 106.

Figure 11:
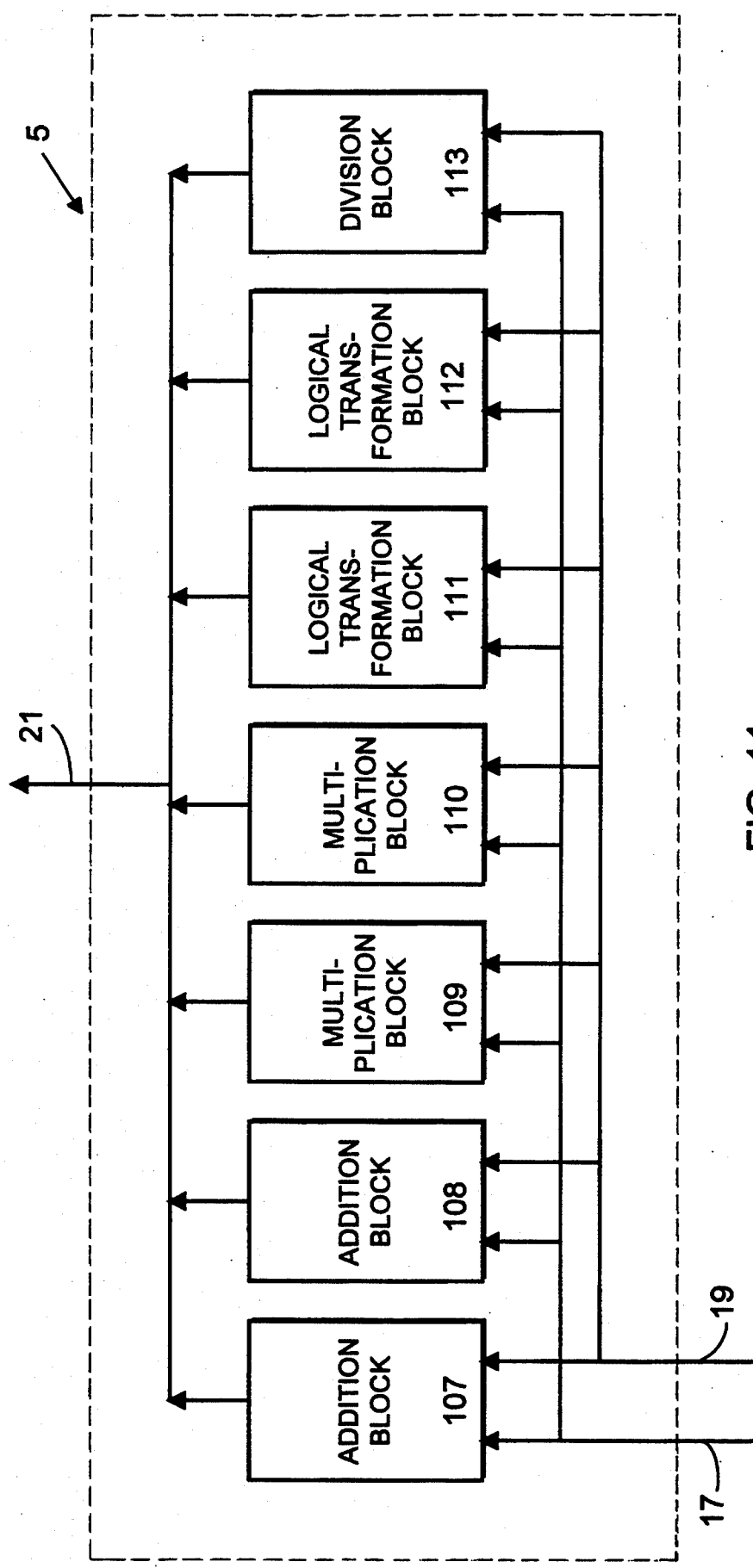
FIG. 11 is the functional circuit of a multi-channel arithmeticologic device of the present invention.

Multi-channel arithmeticologic device -5 (FIG. 11) comprises addition blocks 107 and 108, multiplication blocks 109 and 110, logic transformation blocks 111 and 112, a division block 113.

Figure 12:
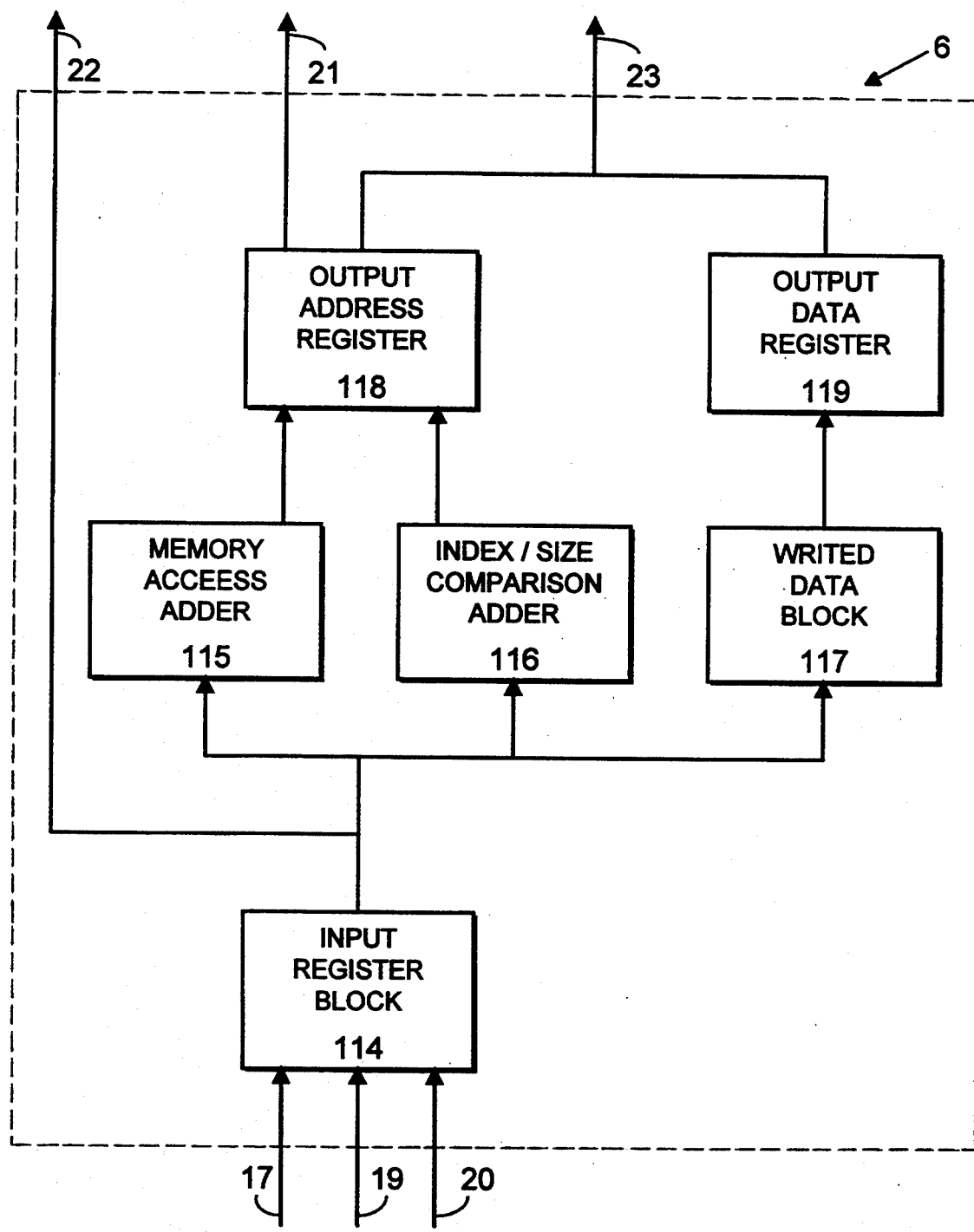
FIG. 12 is the functional circuit of a calling-recording device of the present invention.

Call-recording data device (FIG. 12) comprises an input register block 114, a memory access forming adder 115, an array index/size comparison adder 116, a recorder digit forming block 117, an address output register 118, and a digit output register 119.

Synchronization of the operation of a device is the same as in the prototype—four-cycle. And each and every storing register and/or a register station in the conveyer is brought into step by one of the four phases in relation to the number of stages of the preceding logic.

However, depending on an element base, the type of usable triggers and circuit engineering, another system of synchronization can also be used, a simple, one-phase one, in particular.

No circuits of control and timing signals are shown in the specification.

Upon initialization, a device 12 performs the function of pumping a program code from the internal storage (not shown), for which purpose it issues interrogations over a bus 29 via a conjugation (interface) device 10.

The program code is received via said device 10 over a bus into an instruction buffer memory I. Said control device 12 regulates via a bus 28 the access of a program code from said buffer memory I that is received in the control device 2 over a bus 16.

The control device 2 delivers, via a bus 17, a command to an arithmeticologic device 5, a data call-recording device 6, an indexing device 7, a subprogram device 11 and to the control device 12, reads the operands from a data buffer memory 3 and operates a data commutator 4, thus assuring data transmission over a bus 18 from said device 3 and over a bus 21 of the results of operations of said arithmeticologic device 5 and the call-recording device 6. The data are received in the operand information inputs of said device 5 and said device 6 over the bus 19. Said data are admitted over a bus 20 to the data buffer memory 3 and the subprogram device 11. Data necessary for the operation of said indexing device 7 are transmitted through said device 6 over the bus 22.

The main purpose of the device 6 is scalar references to reading recording internal storage. When reading data in a device 3, a device 6 presents addresses via a bus 23 to an associative memory 8 and a mathematic/physical address-conversion device 9. Given a happty search in the device 8, data are transmitted over a bus 25 to the device 3; otherwise the converted physical address from the device 9 is admitted via a bus 26 to an interface device 10 and further to common internal storage over a bus 30. Data from said internal storage are inserted via said device 10 over a bus 15 into the data buffer memory 3 and the associative memory 8 to reduce the time of access thereto in case of repeated references. On recording in memory in the device 6 a recording address is received via a bus 19, and the recorded number—via a bus 20. The address and number are then delivered via a bus 23 to the device 8, 9.

The indexing device 7 is generator of the addresses of array elements. Before the cyclic section of a program, array descriptors are loaded thereinto via the call-recording device 6 over a bus 22, to which references will be executed in a cyclic program and also index words (the initial index and the step of address increment) and an array element address forming program. In the cyclic section of the program by a command received over the bus 17 from the control device 2, the said indexing device 7 delivers over a bus 24 the required array element addresses to the device 8 and 9 in a way similar to the data call-recording device 6 as described hereinabove.

The central processor utilizes the architecture of an extended instruction word and controls the operation of a device on the basis of static scheduling at the stage of program translation. The instruction in the processor has variable length. The maximum length may contain an assignment for a plurality of the blocks of an arithmeticologic device, a call-recording device, an indexing device, an operation of preparation of transfer and an operation of transfer of control. The address and control instruction fields assure the access of the required number of operands from the memory 3, transmission of the results of preceding operations to the arithmeticologic device 5 and recording the operation results in the memory 3.

The control device 2 is able to produce, over a bus 17 each clock time, an unpacked instruction of the maximum size to thus provide the full loading of the arithmeticologic device 5, the data call-recording device 6 and the indexing block 7.

The majority of blocks in the processor and relationships there—between have parallel organization.

Thus, the interface device 10, the mathematical/physical address conversion device 9, the call-recording device 6 and the indexing device 7 in each clock period can process up to K requests in internal storage where K is the maximal width of the bus of connection with the memory words.

The instruction buffer memory I is embodied according to a twoport diagram and enables one to write in each clock time K words from internal storage and to read instruction words for execution.

The data commutator 4 provides in each clock time transmission of the results of operations and operands read from the multi-port data buffer memory 3 in the arithmeticologic device 5 and the call-recording device 6, the number of operands commutated at the input of these devices being sufficient form starting all of the devices indicated in the extended instruction.

The subprogram device II performs the function of preparing the address context of three procedure transfers and procedure commutation (replacing a text and calling a program code) without stopping the instruction decoding.

This being so, the structure of a central processor gives an opportunity, owing to the substantially parallel organization and architecture of an extended instruction word, to render nonparallel not only calculations in the cycle, but also particular scalar calculations. This is promoted by the provision of the data commutator 4 which contributes to a rapid transmission of results in the capacity of operands in the following operations (a reduced influence of dependence as to data), branching in one of plurality of directions and the conditional embodiment of several parallel program branches (a reduced influence of dependence as to control), and a quick procedure transfer without stopping the decoding.

The transfer of control is carried out in two stages, as in the closest prior art. At the first stage, a transfer index is remembered in a device 12, according to a transfer preparation instruction, on one of the registers 67–70 of the instruction number, a search in an associative memory unit 71 according to the prescribed index, presentation in the corresponding register 74–77 of the index of a transfer address instruction to the instruction buffer memory I.

In case of failure of the search, an instruction number counter 72 delivers a series of requests to the interface device 10 over a bus 29 on the entire page of a program code, whereupon the latter is received, via said device 10 over the bus 15, in the instruction buffer memory I.

Instruction reading addresses are admitted over a bus 28 to the buffer memory I and ensure the access of the required number of instruction words in a single clock time on the corresponding register 35–38 of decoding the instruction of the control device 2. Besides this, the address gets into an instruction indexing counter 34 for forming the subsequent addresses of a program code.

Thus, the instruction buffer memory control device 12 can receive transfer preparation instruction, which ensures the program branching, at the second stage by a command of transfer of control, along one of the prepared directions without stopping decoding, because the codes of all directions are provided on instruction decoding registers 35–38. Branching is carried out with the aid of the character control device 13 in which control transfer conditional characters are loaded over the bus 21 which were computed according to the instructions of relationships in the arithmeticologic device 5.

In order to preserve the control characters of the conveyor in a short cycle, in case of stopping instruction decoding, the device 13 renames the addresses of the control character registers, for which purpose use is made of two adders—61 and 62 for the renaming of a recording address and a reading address, respectively. Renaming is executed through basing operations by the least significant digits of the cycle counter 63.

The program code is stored packed in the instruction buffer memory I, which means that in any extended instruction, fragments are arranged without skipping. Information on the composition of significant fragments is specified by the field of an extended instruction scale and used by shifters 39 and 40 of the access and unpacking of the control device 2, upon forming executive, unpacked instruction presentation.

The instruction decoding counter 34 comprises an instruction address of the instruction decoding registers 36–38. Adders 41, 42, 43 are used for forming the read-out and record absolute addresses of the stack buffer-block 45 and the absolute addresses of the readout buffer-block 46 through the biasing operations of relative instruction addresses.

Unpacked instruction is received in an unpacked instruction buffer memory block 44 and further over the bus 17 to the data buffer memory 3 (reading of operands), the data commutator 4 (access of results, commutation of operands and results), and to the devices 5, 6, 7, 13, 12 (the codes of operations and program code short constants).

In a general case, because of the presence of the associative memory 8 and conflicts in the internal storage at the stage of translation it is impossible to determine the time of operand access to the internal storage.

This results in that when reading the operands from the data buffer memory 3 it may turn out that no data have been received yet, a factor that leads to blocking the next extended instruction in the block 44 and stopping the conveyer at the steps below the block 44. The blocking is provided over the bus 33 from the operand readiness device 14, as a result of check that the operands are available.

Every block 49-1+49-K (memory) of the device 14 corresponds to one channel of reading from the internal storage. In case of reference to internal storage, over the bus 30 to an adder 54 from a mathematical-to-physical address conversion device 9 at an input 31 there is provided an integer defining the maximum of clock periods after which the read-out information ought to be received in the central processor, which integer as defined by a compiler is added in the adder 54 with the current value of the block time in a counter 51. The obtainable value defines the address in a block 49-1 ($I \leq i \leq K$)/memory/ of a corresponding direction on which is written "I" (or "0"). Besides, the same value as defining the number of a block time to which information ought to be read from internal storage is written into a two-port memory block 50-i of a corresponding direction according to the address of a counter 53-i. With every reference to internal storage, the corresponding counter 53-i increases its value by one unit. As the block 49-i and 50-i, the adder 54 has K channels. When information is read from internal storage, the remembered clock time number according to a counter 52-i is read from the memory block 50-i to be delivered to the memory block 49-i as an address to set a but at "0" (or "I"), and along with this, the counter 52-i is increased by one unit. The counter 51 of a current cycle number reads all K of blocks 49-I±49-K, and if the state "I" ("O") is present at least in one of them in the corresponding position, an instruction decoding blocking signal is given to the control device 2 via OR—element 48 at a control input 33.

On receipt of data, the blocking is removed, the operands are picked out of blocks 45 and 46 and admitted to the data commutator 4 via a block 47 over the bus 18.

The provision in the data buffer memory 3 of two block 45 and 46 of stack buffer memory and read-out buffer memory, respectively, is necessitate by the assurance of high efficiency in the conditions of combined scalar-vector calculations. When handling data arrays, the memory 3 is an intermediate buffer between the internal storage and arithmeticologic device 5, a factor that ensures the preliminary access of array elements and preserves the working combination of scalar variables.

The data commutator 4, just is in the prototype, contributes to rapidly using the results of operations as the input operands of the device 5 and the data call-recording device 6, write the results into the internal storage and the data buffer storage 3, which shortens a critical path in realizing the program. The result register of the data commutator 4 is utilized in cases where the operating result should be used between transmission via the commutator 4 and transmission via the data buffer memory 3.

Generally reference to the elements of array is performed at a constant step. This predetermines the organization of the indexing device 7 which, just as in the prototype, comprises K parallel operating units to create a high rate of address generation, which one having the buffer memory blocks of array descriptors and a buffer memory block of operations, the content of which is entered outside of the cyclic part of the program over the bus 22 from the data call recording device 6.

As a matter of fact the device 7 comprises a program of access to the elements of arrays and their descriptors.

On realizing the cyclic part of the program, the control device 2 issues, over the bus 17 to the indexing device 7, the number of instruction of the buffer memory block of operations. Further, all of the units of device 7 fulfill, according to the specified number, a command of computing the address of an array element which is formed by adding the array base address with the value of an array current index. Also formed is the value of a current variable for the subsequent reference to the array (advance over the array changes by one step) and entered in a buffer memory block 84 of array descriptors.

Adders 89 and 90 perform the function of forming the designation addresses of the readout buffer memory block 46. To assure access to the block 46, use is made of a method of movable bases, when in the cyclic program, the address of a loaded cell remains constant, and the base address forms a designated purpose address and changes in each and every cycle by a step increment in the base.

With this aim in view, each unit of the indexing device 7 has base/base increment registers 86 and 85. On the adder 89 there is formed the current designated purpose address of the block 46 and on the adder 90—a base current designated purpose is formed at an increment. The new value of the base is entered in the register 86 of the base, and the formed mathematical address of an array element and the designated purpose address are delivered over a bus 24 from all units to the associative memory 8 and the mathematical-to-physical address conversion device 9.

Figure 7:
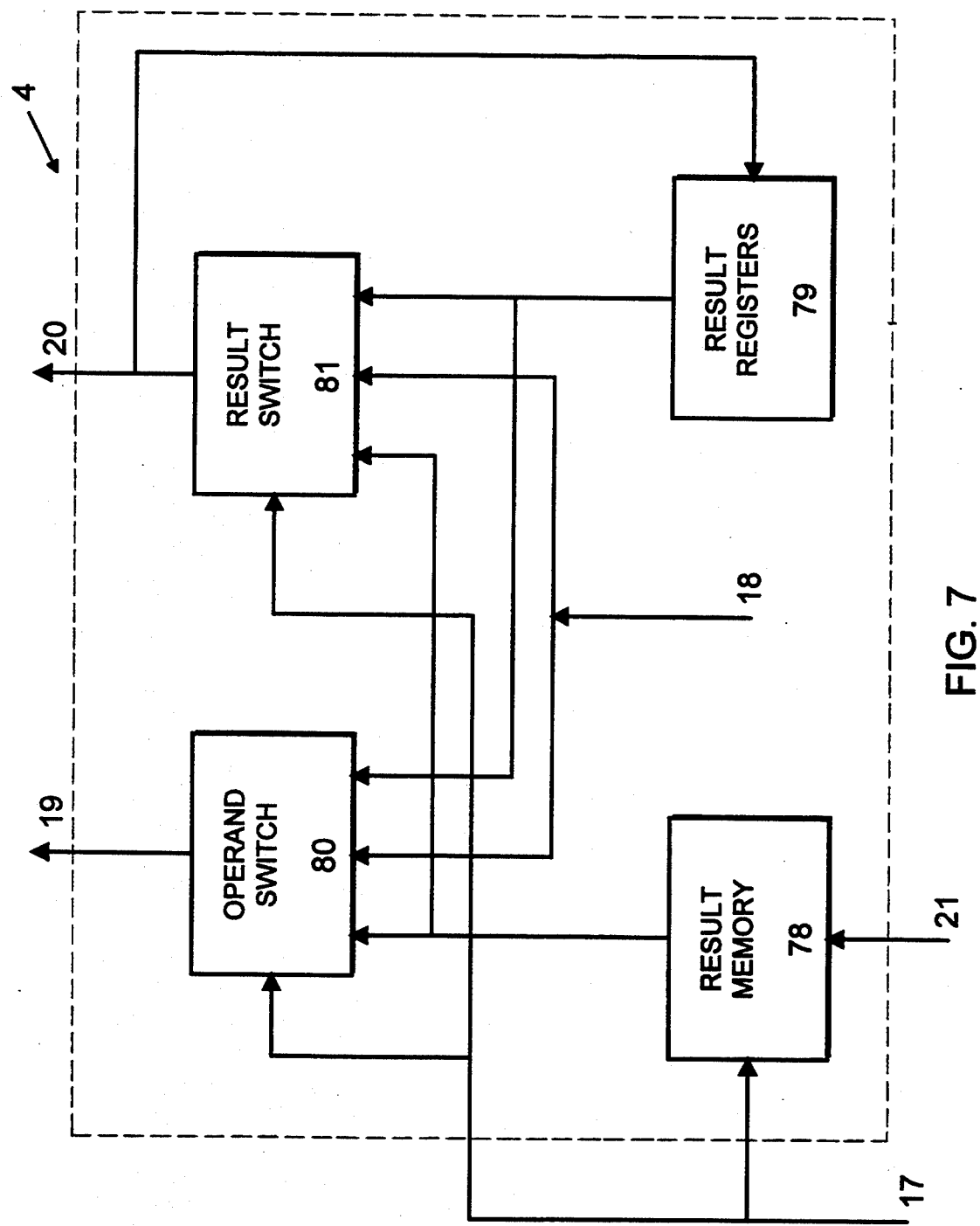
FIG. 7 is the functional circuit of a data commutator of the present invention.

In order to maintain a high rate of references to the internal storage, the unit 9 of mathematical/physical address conversion comprises K (FIG. 7: K=8) units 91-1-91-8, each one assuring the required conversion with the aid of an associative memory block 96 of the correspondence of mathematical and physical addresses.

The filling of block 96 is of a preventive nature, for which purpose the block 91 is constructed according to a twoport diagram and in parallel with a search of a line of correspondence according to the preset address, there is performed a search of the following mathematical page. For vector accesses, the following page is defined in relation to an increment step, and the address of the following page is formed by the adder 94.

With the absence of a line in the block 96 there is given a request to the unit 92 of the internal storage page table. A memory block 100 of said page table comprises a full table of correspondence of the mathematical and physical internal storage.

Adder 99 forms the address of the required table line and a readout is performed from said block 100. With the organization of the page table use is made of N-coding, whereby a secondary reference (arees) is possible from the output of block 100 to the own input.

The picked out line of correspondence is entered in the associative memory block 96 of the specified unit 91. Thus, at the background of references to the current mathematical page, the pumping of a correspondence line is performed for the following mathematical page.

Block 93 of an input buffer memory serves to store requests in case of a search being performed in the unit 92 of the internal storage page table for the current mathematical page. Upon its call the requests to the block 96 are repeated.

Adder 97 serves to form a physical word address (taking the sum of the current page physical address and the word address within the page).

Buffer memory block 95 serves to store data in the internal storage for the time of conversion of the mathematical recording address into a physical one.

Physical addresses and data (in case of recording) are delivered over a bus 26 to the interface device 10.

The filling of the page table memory block 100 and a page base register 98 is executed over a bus 23 of the call-recording device 6.

The subprogram device Ii fulfills the preparation and switch of a context with procedure transfers, and along with this, base registers 102 define the context of the current procedure, additional base registers 103 serve to create the context of the procedures called, an associative information buffer memory block 104 stores the dynamic history the running procedures, and control registers 105 comprise general system registers (timer, clock, configuration registers etc.).

Procedure switching, just as intraprocedure control transfers are performed in two phases. At the stage of preparation, the context is copied from main base registers 102 into auxiliary base registers 103, the "hiding" in the associative information block 104 of a context register subject to correction on procedure switching, the output from internal storage or the formation of a called procedure context in the auxiliary base registers 103, the transfer of a program segment descriptor into a control unit 12 for the pumping of a called procedure code into the instruction buffer memory I and the control device 2.

At the switching stage, the prepared context is transferred to the base registers 102 and a change-over takes place to the decoding of a called procedure program in said control devices 2 and 12. A recycling step is carried out in a similar way excepting the fact that the correction of said context is performed from the block 104 of the associative information BUFFER MEMORY.

As is the case with the prototype, the principal moment in the organization of the subprogram device II is its asynchronous operation as concerns the preparation of said procedure switching that precedes the switching itself.

the data call-recording device 6 performs operations of the formation of a mathematical address to be remembered in the data buffer memory 3 or the itnernal storage is accessed through it, as well as the transfer of operands to the indexing device 7.

Upon forming a mathematical address with the results recorded in a stack, operands (a descriptor and an index) from an input register block 114 are transferred to adders 115, 116 where the mathematical address is formed on the adder 115 by taking the sum of the address of the beginning of the array of a descriptor and an index, and the adder 116 performs substraction of the index from the size of the array. The formed mathematical address is transmitted via an output address register 118 over the bus 21 to the second information input of the data commutator 4 and further over the bus 21 to the third information input of the data buffer memory 3.

When the readout internal storage is accessed, the formed address of the address output register 118 is transmitted over a bus 23 to the first address and information input of the associative memory 8 and to the first address and information input of the mathematical-to-physical address conversion device 9.

On reference to the recording internal storage, a written number is delivered additionally together with the address over the bus 23.

And as this is so, the architecture of an extended instruction word as presented with a possibility of information being processed in parallel, which is based on a compilation method on the basis of a program flow graph makes it possible to render purely scalar computations unparallel alongside the vector processing.

The introduction of the control character device 13 and the instruction decoding blocking device 14 enables one to increase rapid action by reducing losses of clock periods in the instruction processing conveyer as compared to the prototype.

The invention can be used for scientific-technical and economic-statistical calculations, for solving the tasks of automation of designing, modelling and control operations.

We claim:

1. A central processor of the type used for scientific-technical, economic-statistical computations, and for solving the problems of automation of designing, modelling and controlling operations with the architecture of a wide instruction word, assuring high efficiency on both vector and scalar calculations, comprising and interface unit (10) coupling the central processor with common main internal memory via an exchange bus (30); a multichannel arithmetical logical unit (5) for performing operations in speculative and normal modes of operation; a data switch (4) connecting the input of arithmetical logical unit (5) with an output of said arithmetical logical unit and with a data buffer memory (3) comprising a data stack of procedures and a subset of array elements preloaded for a preliminary treatment in a loop; a data cache memory (8) coupled to said interface unit (10) for storing global data absent in the data buffer memory (3); a load store unit (6) coupled to said data switch and said data cache memory for calculating scalar addresses; and a multichannel indexing unit (7) coupled to said load store unit for calculating vector addresses for data exchange with the common main internal memory via a translation lookaside buffer (9) executing a load of a current line of the corresponding virtual to physical address and additionally, for vectors, a preliminary load of a line of a next virtual page; a subprogram unit (11) for the preparation of an address environment, the prefetch of a new program code and control of procedure transfer without breaking of the instruction decoding coupled to the data cache memory (8), said unit (9) and with a control unit (2) for providing parallel start of said multichannel arithmetical logical unit (5), the load store unit (6) and the multichannel indexing unit(7), and for the preliminary concurrent preparation of transfers of control, and also connected to the data buffer memory (3), an instruction buffer memory (1) coupled to a control unit (12) which stores a working code set of procedures and coupled to the control unit 2; a control attributes unit (13) for the transfer of control along one of the prepared transfers of control without breaking the clocks with the dynamic renaming of control attributes addresses in a loop; and an operand readiness unit (14) for operands pre-requested from the common main internal memory; said control attributes unit (13) being coupled with the arithmetical logical unit (5) and the control unit (2), and the said unit (14) being connected to said control unit (2), the interface unit (10) and the translation lookaside buffer (9).

* * * * *